Patented Jan. 20, 1953

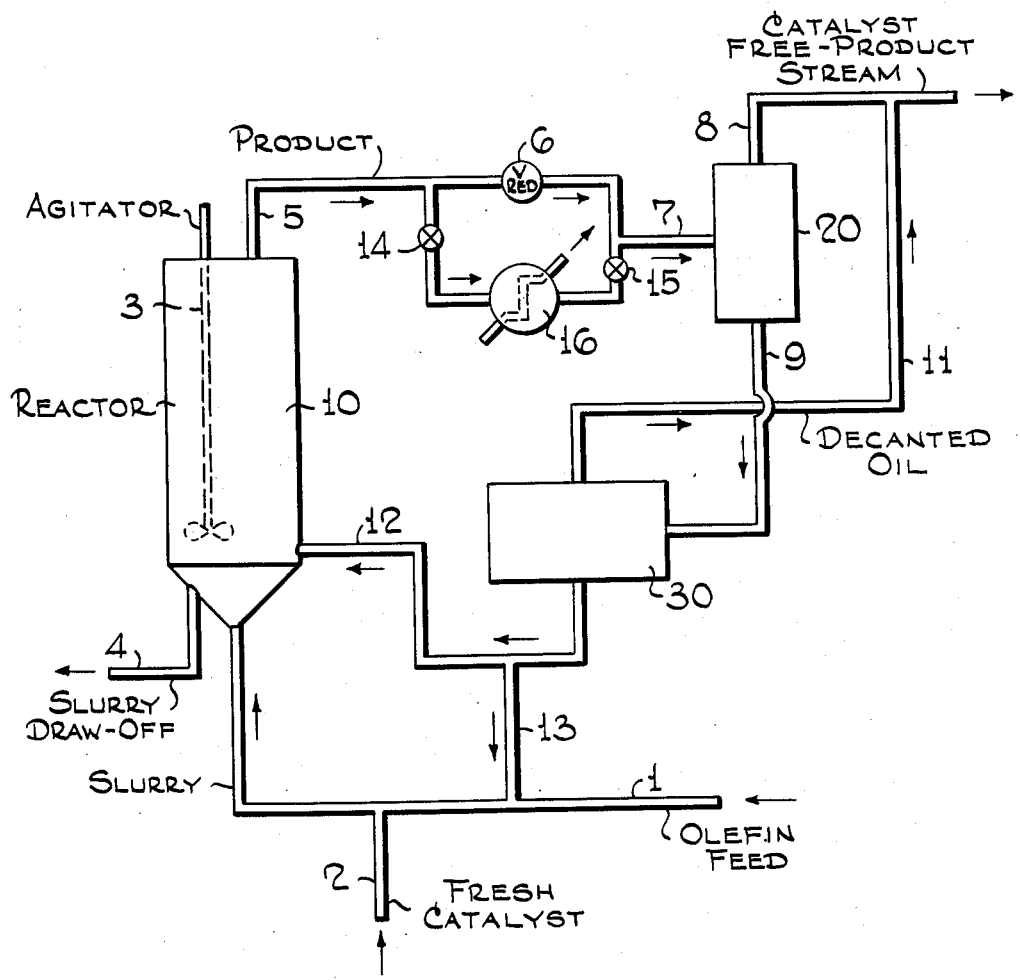

2,626,292

UNITED STATES PATENT OFFICE 2,626,292

REMOVAL OF FINELY DIVIDED SOLIDS FROM POLYMERIZATION STREAMS

Edward J. Gornowski, Cranford, N. J., assignor to Standard Oil Development Company, a corporation of Delaware Application February 9, 1951, Serial No. 210,237

4 Claims. (Cl. 260—683.15)

The present invention is concerned with the polymerization of olefins. The invention is especially directed to the polymerization of mixed olefin feed containing, for example, ethylene, propylene and butylene by contacting these gases with the polymerization catalyst while agitating at temperatures in the range of from about 350° F. to 600° F. and at pressures from about 200 lbs./sq. in. to 1200 lbs./sq. in. In accordance with the present invention, an improved slurry polymerization process is secured by the removal of finely divided solids from the polymerization product stream. These finely divided entrained catalyst particles in product streams from slurry type polymerization reactors are removed by causing partial condensation of the stream. The solids are removed in the condenser phase and pumped back into the reactor. Condensation is brought about by cooling or by depressuring the stream.

It is well known in the art to treat olefins and olefin-containing streams with various catalysts, as for example, phosphoric acid in order to polymerize the olefins to higher boiling hydrocarbon constitutents. In general, the feed streams comprise normally gaseous olefins, such as ethylene, propylene, butylenes, pentylenes and mixtures thereof, which are polymerized to hydrocarbon constituents which boil in the range below about 430° F. Although 100% olefinic streams may be utilized as feed stocks, it is generally preferred to have paraffinic diluents present in the range of from about 40% to 90% by weight in order to reduce the formation of carbonaceous deposits on the catalyst and to provide better temperature control in the catalyst bed. These phosphoric acid catalysts are usually deposited on solid carriers, as for example, diatomaceous earth, kieselguhr, silica gel, and the like. In general, these catalysts are satisfactory for securing the polymerization of the olefins in the feed stream. However, there exist certain inherent disadvantages with respect to their use. This is particularly the case when a slurry operation is utilized wherein the reactants are in the liquid phase or in a dense gaseous phase.

One of the principal problems with respect to a successful slurry operation is the removal of entrained catalyst particles from the hydrocarbon stream. Since the process operates under high pressure, the presettling operation or a centrifugal operation would present additional problems. Furthermore, the use of a cyclone type separator would be complicated by the high density fluids and by the return of the relatively sticky solids into the system. The present invention is concerned with an improved operation wherein solids from a high pressure hydrocarbon product stream are removed from the stream as it flows from a slurry polymerization reactor by partial condensation of the hydrocarbon product stream. By the present invention, partial condensation is brought about by either cooling the stream at constant pressure or by depressuring, depending upon which method is advantageous. In operation of the phase separation, the heavier or liquid phase settles out, taking along with it the entrained solids. Thus, one specific embodiment of the present invention comprises a process for the production of normally liquid hydrocarbons from a normally gaseous olefin fraction comprising propylene and butylene by passing the normally gaseous olefin fraction upwardly through a finely divided polymerization catalyst (80–200 mesh) at a temperature between 350 and 600° F., superatmospheric pressures between 200 and 1200 lb./sq. in. and at a velocity of one to two feet per minute. By operating in this manner, the olefin fraction is thoroughly mixed with the catalyst which is kept in suspension in the material being polymerized. The reactor pressure and/or the temperature are adjusted to avoid at any time the coexistence of a gaseous and liquid state in the reactor. It follows, therefore, that at any given time the mixture of olefins and finely divided catalyst may be called either a slurry or a fluidized mass, although both states are not present simultaneously.

The object of the present invention is to remove entrained catalyst particles from the product stream in a slurry type operation. The invention may be readily understood by reference to the drawing illustrating one embodiment of the same. Referring specifically to the drawing, an olefin feed stream is introduced into reactor 10 by means of feed line 1. Fresh catalyst is introduced into the olefin feed by means of line 2 and the resulting slurry introduced into reactor 10. Satisfactory agitation is secured by agitator or equivalent means 3. Temperature and pressure conditions are adjusted in reaction zone 10 to secure the desired polymerization of the olefin. A slurry drawoff line 4 is provided in order to withdraw spent catalyst as desired. The polymerized product stream is withdrawn from the top of reaction zone 10 by means of line 5. Due to the nature of the reaction, this stream contains entrained catalyst particles.

In accordance with one concept of the present invention, the pressure on this stream is reduced by passing the same through pressure reducing valve 6. The stream is then introduced into separation zone 20 by means of line 7, wherein a phase separation occurs. The lighter phase free of catalyst particles is withdrawn from zone 20 by means of line 8 and further handled or refined to secure the desired boiling fraction. The heavier phase containing entrained catalyst particles is withdrawn from separation zone 20 by means of line 9 and preferably passed to a settling zone 30. It is to be understood, however, that this stream may bypass separation zone 30.

In accordance with the preferred method of operation, the heavier stream is introduced into separation zone 30 wherein an oil phase separates which is decanted by means of line 11 and preferably combined with the product stream removed by means of line 8. The heavy slurry stream is removed from separation zone 30 by means of line 12 and reintroduced into the system. Under certain circumstances it may be desirable to combine this heavy slurry stream with the olefin feed stream by means of line 13.

In accordance with another adaptation of the invention, phase separation is secured in zone 20 by closing valve 6 and opening valves 14 and 15. Under these conditions, the product stream is cooled in zone 16 and then introduced into zone 20 wherein the phase separation occurs.

The invention is broadly concerned with an efficient means of removing entrained catalyst particles from the product stream in a slurry polymerization reaction. In carrying out the present invention, it is to be understood that the catalyst particles may have sizes in the range of 80 to 200 mesh and higher. Furthermore, fluidization materials may be employed such as a finely divided adsorbent material such as silica gel, bauxite, aluminum, and the like.

The catalyst which has been found suitable for this process comprises a composite of phosphoric acid on kieselguhr or silica gel. The phosphoric acid may be present in amounts between 50 and 90% and may be promoted with 1 to 5% nickel or copper phosphate. One suitable composition consists of 78% phosphoric acid supported on 20% silica gel and promoted with 2% nickel phosphate activated at a temperature between 500 and 800° F.

The invention will be further explained in connection with the drawing which illustrates several specific embodiments of the same.

Referring to the drawing, a normally gaseous $C_3$, $C_4$ hydrocarbon fraction containing 25% propylene, 25% propane, 25% butylene and 25% butane, is introduced at 100° F. and about 125 lbs./sq. in. gauge by line 1 to a heat exchanger where it is heated to about 250° F. The heated feed is then introduced by line 1 into the bottom of reaction zone 10 maintained under 1000 lbs./sq. in. gauge pressure and at a temperature of 450° F. The reaction zone contains a finely divided catalyst consisting of phosphoric acid deposited on kieselguhr of about 140–200 mesh. The feed is introduced upwardly through this catalyst at about 1 to 2 feet per minute; the catalyst is maintained in suspension in the feed by use of a suitable stirring device. The conditions are set within the reaction zone so that actually there is only one fluid phase present. These conditions are preferably near the critical temperature and pressure for a 50:50 mixture of polymer and $C_3$, $C_4$ components but outside the region in which two fluid phases appear. Pressures of about 1000 lbs./sq. in. gauge in the reaction zone have been found suitable to maintain this single phase. There is very little catalyst above the pseudo level within the reactor except for entrainment.

It may be necessary to maintain an additional adsorptive agent in the reaction zone to prevent agglomeration of the catalyst. Accordingly, there may be interdispersed with the catalyst about 10–50% by weight of finely divided silica gel of from 140–200 mesh or equivalent. This silica gel does not contain any catalyst deposited on it and presumably acts to adsorb solid or high boiling polymers formed initially, although this invention is not intended to be limited by any theory as to the action of the silica gel. The proper state of hydration of the catalyst, if necessary, may be maintained by the introduction of regular quantities of water. This is not illustrated in the drawing but may readily be accomplished by well known means.

The products from zone 10, boiling for the most part in the motor fuel boiling range, are removed by line 8 and passed through pressure reducing valve 6, which results in a great enough reduction in pressure to cause phase separation. The products are then passed by line 7 to separation zone 20.

From time to time catalyst is removed from reaction zone 10 through line 4 and handled as described.

The amount and extent to which the product stream is cooled in zone 16 or the pressure reduced through pressure reducing valve 6 may vary appreciably depending upon the extent to which entrainment occurs, and also depending upon the actual pressure and temperature conditions employed in reaction zone 10. For example, if the temperature employed in reaction zone 10 is about 450° F., and the pressure 500 lb./sq. in., satisfactory separation of the entrained catalyst particles will be secured providing the product stream is cooled to a temperature in the range from about 375 to 425° F. In general, the product stream should be cooled sufficiently to secure the desired phase separation which will efficiently remove entrained catalyst particles. If the pressure be reduced in order to secure the phase separation, it is felt that a satisfactory mode of operation is to reduce the pressure from about 200 to 300 pounds below the pressure existing in the reactor, when operating at relatively high pressures of about 1000 pounds per square inch gauge. If the pressures in the reactor are lower than 1000 pounds per square inch gauge, the extent to which the pressures are reduced through the pressure reducing valve will be less.

Having described the invention, it is claimed:

1. Improved process for polymerizing normally gaseous olefins which comprises contacting the olefins in a reaction zone at temperatures between about 350° F. and 600° F., and pressures between about 200 lb./sq. in. and 1200 lb./sq. in., so that but one fluid state exists in the presence of a finely divided suspended catalyst comprising phosphoric acid deposited on a carrier, whereby catalyst particles are entrained in the product stream, withdrawing a product stream containing entrained catalyst from said reactor, partially condensing said product stream to form a heavy phase containing said entrained catalyst and a substantially catalyst-free light phase, and returning said heavy phase containing said entrained catalyst particles to the reaction zone.

2. Process as defined by claim 1 wherein said product stream is cooled to secure said phase formation.

3. Process as defined by claim 1 wherein said product stream is depressurized to cause said phase formation.

4. Process as defined by claim 1 wherein said heavy phase is passed to a settling zone wherein a catalyst-free oil phase separates, decanting said oil phase and combining the same with the light phase secured in said phase formation.

EDWARD J. GORNOWSKI.

REFERENCES CITED

The following references are of record in the file of this patent:

FOREIGN PATENTS

| Number | Country | Date |
|---|---|---|
| 2,354,261 | Hemminger | July 25, 1944 |